United States Patent [19]
Lagnier

[11] Patent Number: 5,322,107
[45] Date of Patent: Jun. 21, 1994

[54] TIRES FOR A VEHICLE TRAVELING ON SNOW-COVERED AND ICY GROUND

[75] Inventor: Alain Lagnier, Romagnat, France

[73] Assignee: Compagnie Generale des Etablisse-Michelin-Michelin & Cie, Clermont-Ferrand Cedex, France

[21] Appl. No.: 30,449
[22] PCT Filed: Sep. 24, 1991
[86] PCT No.: PCT/FR91/00745
  § 371 Date: Mar. 24, 1993
  § 102(e) Date: Mar. 24, 1993
[87] PCT Pub. No.: WO92/05969
  PCT Pub. Date: Apr. 16, 1992

[30] Foreign Application Priority Data
Oct. 3, 1990 [FR] France .................. 90 12272

[51] Int. Cl.⁵ .............................. B60C 11/11
[52] U.S. Cl. ................. 152/209 R; 152/DIG. 3
[58] Field of Search ......... 152/209 R, 209 D, DIG. 3

[56] References Cited

U.S. PATENT DOCUMENTS

| | | |
|---|---|---|
| 3,515,197 | 11/1966 | Boileau . |
| 4,667,718 | 5/1987 | Fontaine .................... 152/209 R |
| 4,802,547 | 2/1989 | Nakasaki . |
| 4,994,126 | 2/1991 | Lagnier . |
| 5,203,933 | 4/1993 | Nagahisa .................... 152/209 R |

FOREIGN PATENT DOCUMENTS

| | | | |
|---|---|---|---|
| 0194069 | 9/1986 | European Pat. Off. . | |
| 3738159 | 5/1988 | Fed. Rep. of Germany . | |
| 0006802 | 1/1987 | Japan ........................ | 152/209 R |
| 0034205 | 2/1988 | Japan ........................ | 152/209 D |
| 0291704 | 11/1988 | Japan ........................ | 152/209 R |
| 0009008 | 1/1989 | Japan ........................ | 152/DIG. 3 |
| 2299910 | 12/1990 | Japan ........................ | 152/DIG. 3 |
| 502992 | 3/1939 | United Kingdom . | |

Primary Examiner—Michael W. Ball
Assistant Examiner—Nancy T. Krawczyk
Attorney, Agent, or Firm—Brumbaugh, Graves, Donohue & Raymond

[57] ABSTRACT

In order to optimize the behavior of a conventional passenger car on snow-covered and icy ground, the driving axle of said vehicle is equipped with tires the treads (1) of which are provided with elements in relief (11) having incisions (14) of a width other than zero, the traces of which are transverse while the load-bearing axle of the same vehicle is equipped with tires of the same structure but with treads (2, 3) provided with elements in relief or blocks (21, 31) having incisions (24, 34) of a width other than zero, the traces of which are elliptical.

6 Claims, 3 Drawing Sheets

TIRES FOR A VEHICLE TRAVELING ON SNOW-COVERED AND ICY GROUND

BACKGROUND OF THE INVENTION

The present invention concerns a set of tires for conventional passenger cars having a driving axle and a load-bearing axle, the tires which equip the drive wheels having different treads than the tires equipping the load-bearing wheels.

Such equipping is known. The applicant's French Patent 1 473 029 teaches that the stability of vehicles is improved and that the tendency to oversteer is attenuated if the drift of the tires mounted at the rear of the vehicle is less than the drift of the tires mounted at the front. Thus, in the case of fast, super-powerful vehicles, the best solution at the time consisted in equipping the rear and the front of the vehicle with tires of identical size but the coefficients of drift of which vary between the rear and the front, these coefficients of drift being obtained on basis of modifications in internal structure or modifications of the tread.

In addition to the fact that the front-position rear-position set is not the equivalent of the drive-axle load-bearing-axle set, the tires considered above are not tires especially designed for equipping a vehicle intended to travel on poorly adherent ground such as snow-covered, icy, wet or muddy ground.

On these vehicles, the driving axle is required to transfer a torque onto the poorly adherent ground in order to transmit movement to the vehicle and this transmission of the torque must be effected, if possible, with the least possible wear of the tread. As to the load-bearing axle, it participates only slightly in the presence of longitudinal forces, but it is, however, capable of contributing to good braking of the vehicle. On the other hand, it must contribute practically exclusively to the stability of the vehicle on ground of the type in question and, in particular, to the transverse road-holding of the vehicle, whether on a straight line or on curves.

Patent Application EP 0 194 069 is another example. It shows a train of radial tires of the same size and same internal structure for equipping a vehicle intended to travel on any ground and having at least one driving axle and one load-bearing axle.

The tires of the two axles are provided with treads having the same so-called V pattern, the tires of the driving axle having a direction of travel opposite that of the tires of the load-bearing axle, and these treads being provided with elements in relief or blocks provided with incisions made by knife, the incisions of the central row of blocks being transverse.

Such equipping does not make it possible to obtain the compromise of desired properties such as described above.

SUMMARY OF THE INVENTION

In order to obtain the compromise of associated properties, the invention proposes equipping a vehicle intended to travel on snow-covered, icy, wet or muddy ground with radial tires of the same internal structure, the tires of the driving axle or axles having treads provided with blocks having incisions of a width other than zero the traces of which on the surface of the tread are transverse, and the tires of the load-bearing axle or axles having treads provided with blocks having incisions of a width other than zero the traces of which on the surface of the tread are elliptical.

By transverse traces of the incisions there are understood either straight lines of a direction parallel to the axis of rotation of the tire or traces the direction of which forms an angle of at most about 20° with a line parallel to the axis of rotation or sinusoidal or broken-line traces the mean axes of which are parallel to the axis of rotation of the tire or form an angle of at most about 20° with said axis.

Within the definition of elliptical trace there is also to be included a circular trace, since a circle is mathematically merely a special case of the ellipse.

Preferably, the treads of tires intended to equip the driving axles will be provided with blocks or elements in relief in the form of truncated prisms or pyramids with a polygonal base, the number of sides of said base being not greater than six and preferably equal to four. These blocks are separated by transverse grooves in circumferential direction, the expression "transverse" having the same definition as in the case of the incisions, and by longitudinal grooves in the axial direction. By longitudinal groove there is understood a groove which is perfectly longitudinal but also a groove formed of zigzag straight-line segments, these segments forming an angle of at most about 25° with the circumferential direction.

The treads of tires intended to equip the load-bearing axles will be preferably provided with frustoconical blocks of elliptical base and/or frustoconical blocks of circular base.

In the case of an elliptical base, the minor axis of the ellipse will have a length which will not be less than 0.6 times the length of the major axis of the ellipse. If the frustoconical blocks of circular base are provided with at least two concentric, circular incisions, the frustoconical blocks of elliptical base can be provided either with at least two circular incisions or with at least two elliptical incisions.

The tread of the tires for load-bearing axles is either provided exclusively with frustoconical blocks of circular base or provided exclusively with frustoconical blocks of elliptical base, or provided with both frustoconical blocks of elliptical base and frustoconical blocks of circular base. Whatever the configuration of the tread, the frustoconical blocks are advantageously all separated from each other by hollows, the surface occupied on the surface of the tread for the blocks being advantageously between 0.25 times and 0.45 times the total surface of said tread.

The dimensions of the frustoconical blocks on the surface of the tread may vary. In the case of blocks of circular base, the radius of the circle may vary from 15 mm to 35 mm, and in the case of blocks with elliptical base the length of the major axis of the ellipse is between 25 and 58 mm.

As the treads for load-bearing tires must, however, participate in the braking of the vehicle, it is advantageous that, in the case of the presence of frustoconical blocks of elliptical base, the major axes of the ellipses be oriented transversely.

DESCRIPTION OF THE DRAWINGS

The invention will be better understood with the aid of the drawings, which show various nonlimitative embodiments and in which.

DESCRIPTION OF THE PREFERRED EMBODIMENTS

Figure 1:
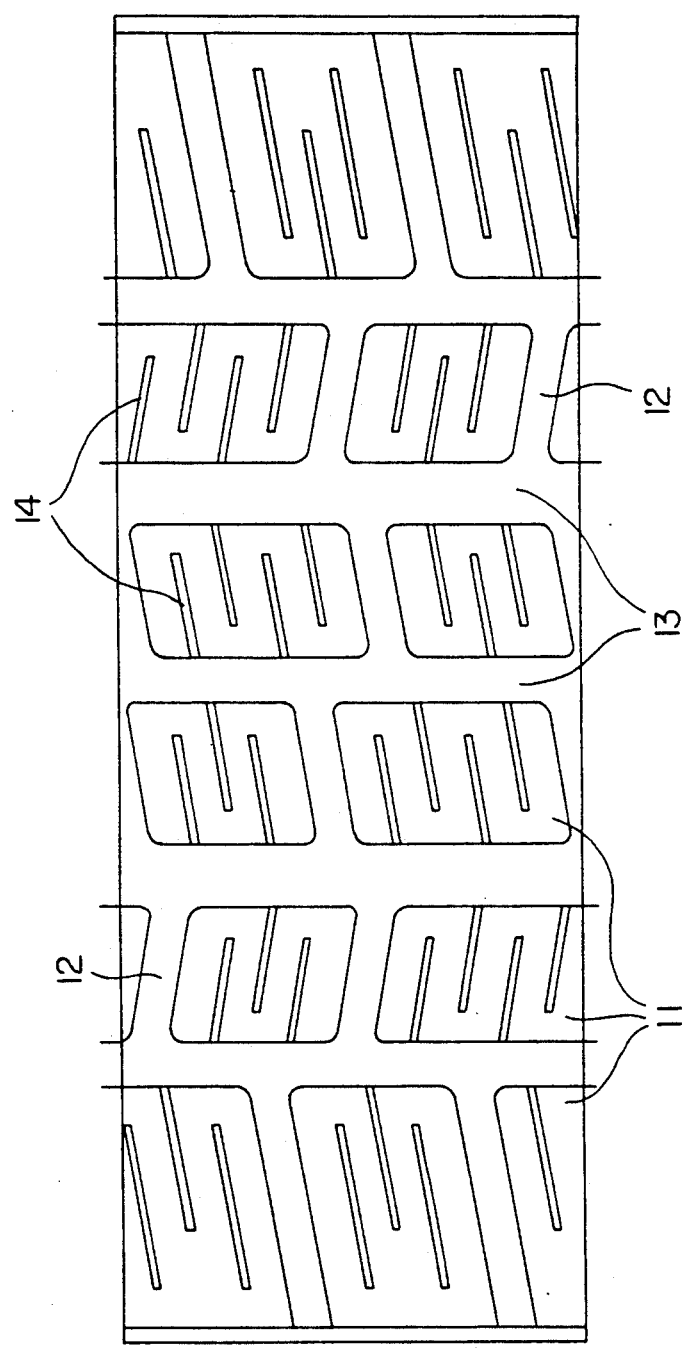
FIG. 1 is a diagrammatic view of a sector of tread for a tire intended to equip a driving axle.

The portion of tread 1 of a 175 R 14 X tire intended to equip the driving axle shown in FIG. 1 comprises six rows of elements in relief or blocks 11 in the form of truncated pyramids having a quadrilateral base. These blocks 111 are separated in axial direction by longitudinal grooves 13 and in circumferential direction by transverse grooves 12, the width of which grooves is generally between 3 and 7 mm. The blocks 11 are provided with incisions 14 having linear traces on the surface of the tread 1 with, in each element in relief, orientations parallel to each other and transverse.

These incisions 14 are also parallel to the transverse grooves 12, so that all the edges created by the grooves and by the incisions are substantially perpendicular to the equatorial plane of the tire, hence the ability of this tire to transmit a driving torque.

Figure 2:
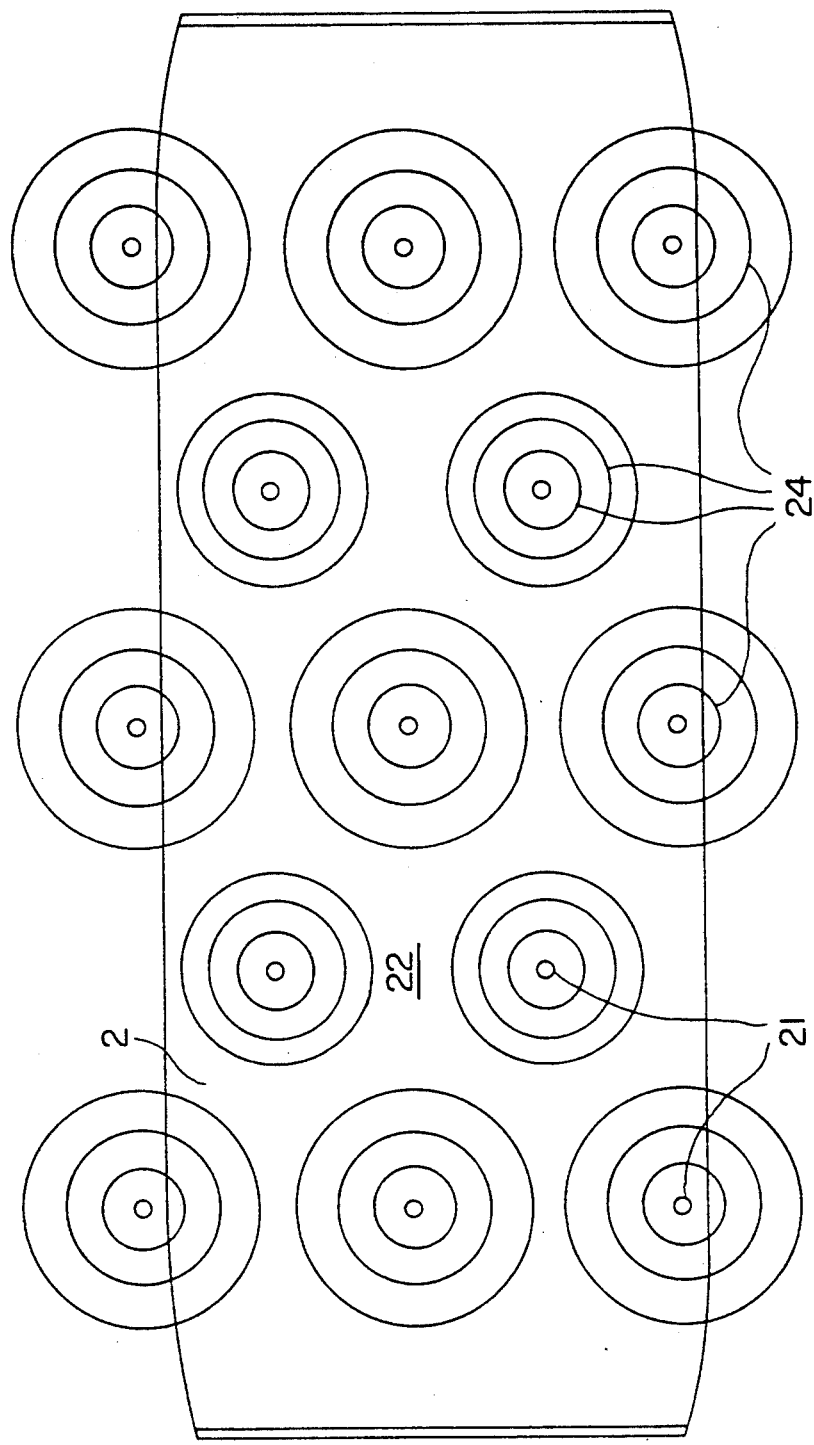
FIG. 2 is a diagrammatic view of a sector of tread for a tire intended to equip a load-bearing axle.

The portion of tread 2 of the same 175 R 14 X tire intended to equip the load-bearing axle is shown in FIG. 2 and comprises five rows of frustoconical blocks with circular base 21, separated in axial and circumferential direction by hollows 22. The blocks 21 are all provided with at least two incisions 24 which are circular and concentric to each other, that is to say effective incisions whatever the direction of the stress imposed upon the tread. The same is true of the circular edges of the blocks 21.

Figure 3:
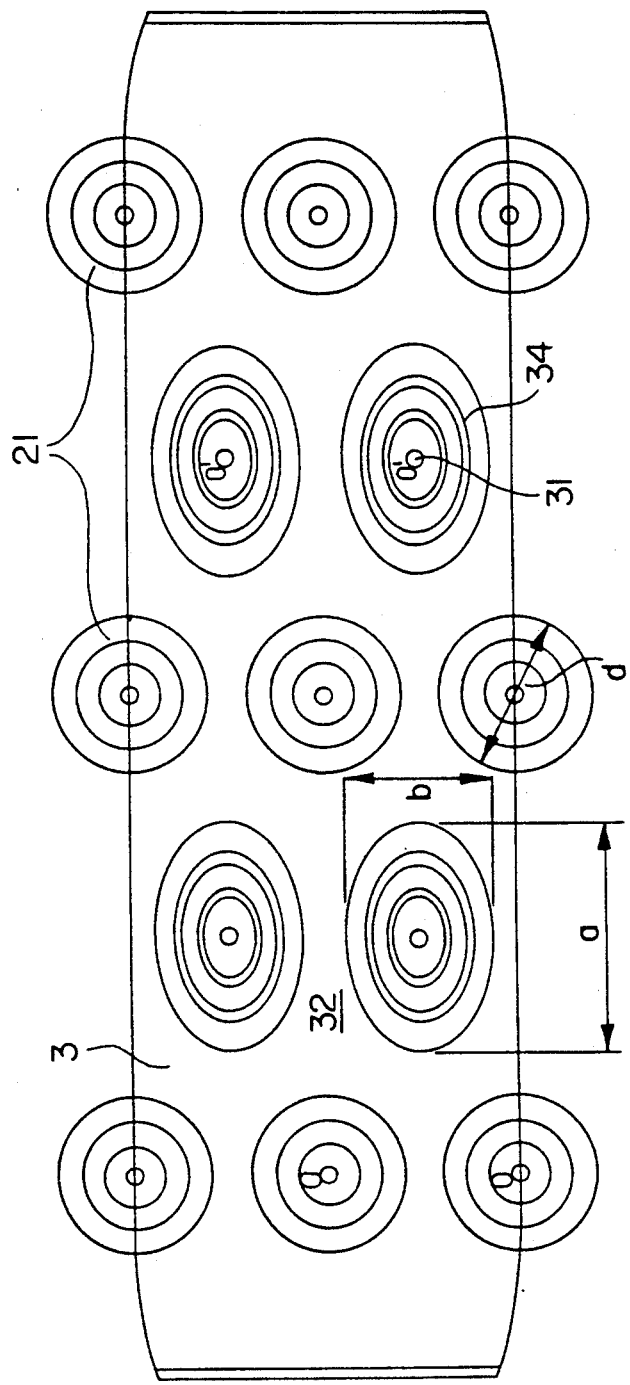
FIG. 3 is a diagrammatic view of a sector of a variant tread for a tire of a load-bearing axle.

The portion of tread 3 in FIG. 3 is a variant of the tread shown in FIG. 2. The two rows of frustoconical blocks with circular base of smaller diameter are replaced by two rows of frustoconical blocks 31 of elliptical base, the minor axis b having a length equal to the diameter d of the circular base of the blocks 21 of small diameter of FIG. 2, and the major axis a having a length equal to 1.55 times the length of the minor axis b.

In the case shown in FIG. 3, the diameter of the blocks of circular base is 20 mm, the minor axis b of the blocks of elliptical base has a length of 20 mm, and the major axis a has a length of 31 mm.

The centers 0 of the circular bases of the blocks 21 are circumferentially 63 mm apart. The centers 0' of the elliptical bases of the blocks 31 are circumferentially 63 mm apart. The circumferential lines passing on the one hand through the centers 0 and on the other hand through the centers 0' are axially apart by the same amount, equal to 31.5 mm.

If one compares the performances obtained with a vehicle equipped with four tires provided with treads in accordance with FIG. 1 with the same vehicle equipped on the driving axle, which is also the front axle, with tires provided with treads according to FIG. 1 and on the load-bearing axle, which is also the rear axle, with tires provided with treads according to FIG. 2, the following results can be noted.

In the hydroplaning test, which consists in analyzing the behavior of the vehicle introduced linearly at 90 km/hr into a pool of water of a height of 5 mm, if one assigns the number 100 to the control vehicle (four treads according to FIG. 1), the so-called test vehicle is clearly more stable, by about 10%.

On the other hand, on wet ground, that is to say ground in which the water has a height of at most 2 mm, braking distance measurements give the advantage to the control vehicle by about 15%.

As to the behavior on snow or on ice, whether in a motivity test (starting, for instance, on an up-grade) or in a braking test, it is difficult to announce any conclusion, in view of the existing dispersions in measurement.

The tests enumerated above concern only the behavior of a vehicle traveling in a straight line. If we consider the behavior in a curved line, the following two tests show a clear advantage on the part of the test vehicle equipped with treads with frustoconical blocks; the first test concerns the behavior of the vehicle on a snow-covered, winding road and the advantage in stability, in handling of the vehicle, as well as in progressiveness of the response to action of the steering wheel can be estimated at 50%. This advantage is furthermore again present in curve behavior on ice-covered ground and in behavior on dry winding roads, but of less importance since it amounts to about 15%.

In other words, the "mixed" set permits better equilibrium of the vehicle in all travel configurations involving transverse forces on the type of ground in question.

I claim:

1. A vehicle intended to travel on snow-covered, icy or wet ground and having at least one driving axle and one load-bearing axle which are equipped with a train of radial tires of the same size and same internal structure, the tires of the driving axle(s) having treads provided with elements in relief of first blocks provided with incisions of a width other than zero and the traces of which incisions on the surface of the tread are only transverse, and the tires of the load-bearing axle(s) having treads provided with elements in relief or second blocks provided with incisions of a width other than zero, characterized by the fact that the traces of the incisions on the surface of the tread of the second blocks are only elliptical.

2. A vehicle according to claim 1, characterized by the fact that the first blocks are truncated pyramids having a multi-sided base which is at most hexagonal separated in circumferential direction by transverse grooves and in axial direction by longitudinal grooves.

3. A vehicle according to claim 1, characterized by the fact that the second blocks are truncated cones with elliptical or circular base, separated from each other by hollows.

4. A vehicle according to claim 3, characterized by the fact that the second blocks all have a circular base.

5. A vehicle according to claim 3, characterized by the fact that the second blocks include blocks having a circular base and blocks having an elliptical base, the major axes of the ellipses being transverse.

6. A vehicle according to claim 1, characterized by the fact that the first blocks are truncated pyramids having a quadrilateral base separated in circumferential direction by transverse grooves and in axial direction by longitudinal grooves.

* * * * *